W. N. MATHEWS.
APARTMENT TANK GLASS FURNACE.
APPLICATION FILED DEC. 3, 1918.
1,324,917.
Patented Dec. 16, 1919.
3 SHEETS—SHEET 1.
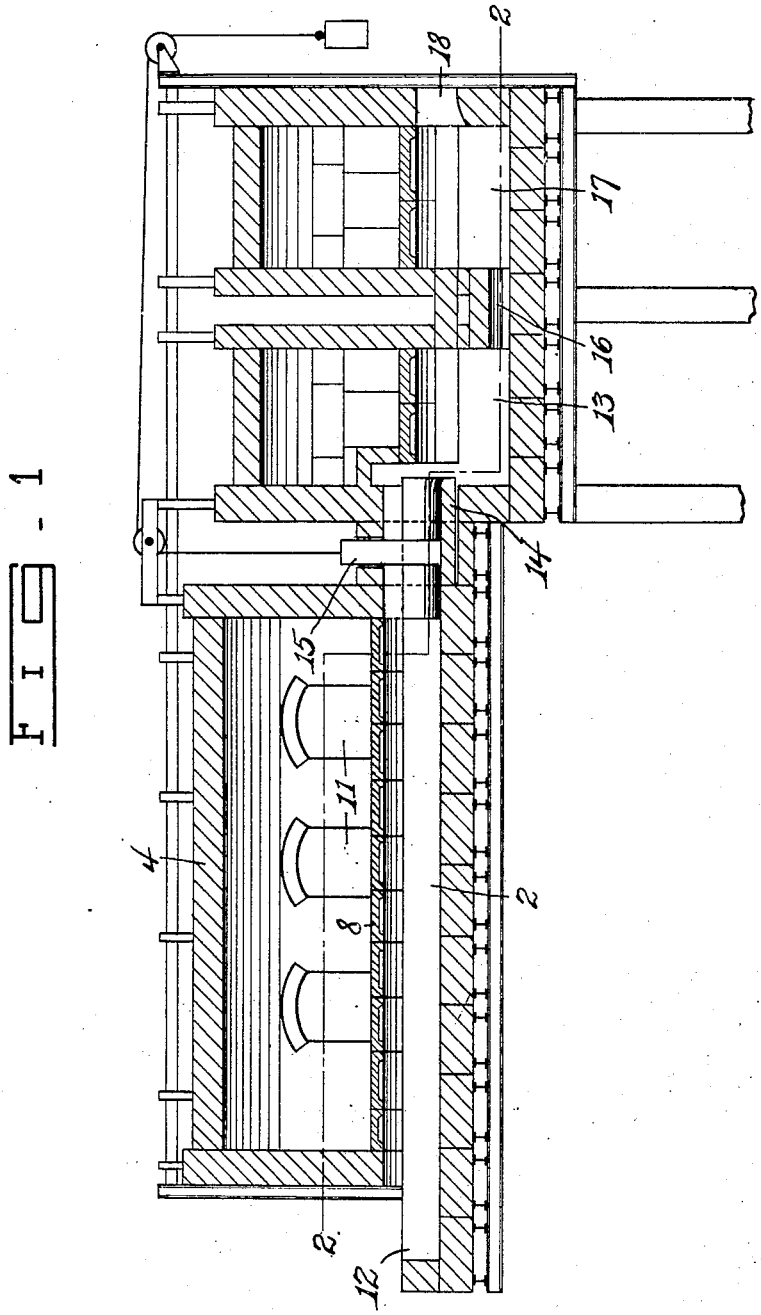
INVENTOR
W. N. Mathews.
By H. E. Dunlap
ATTORNEY

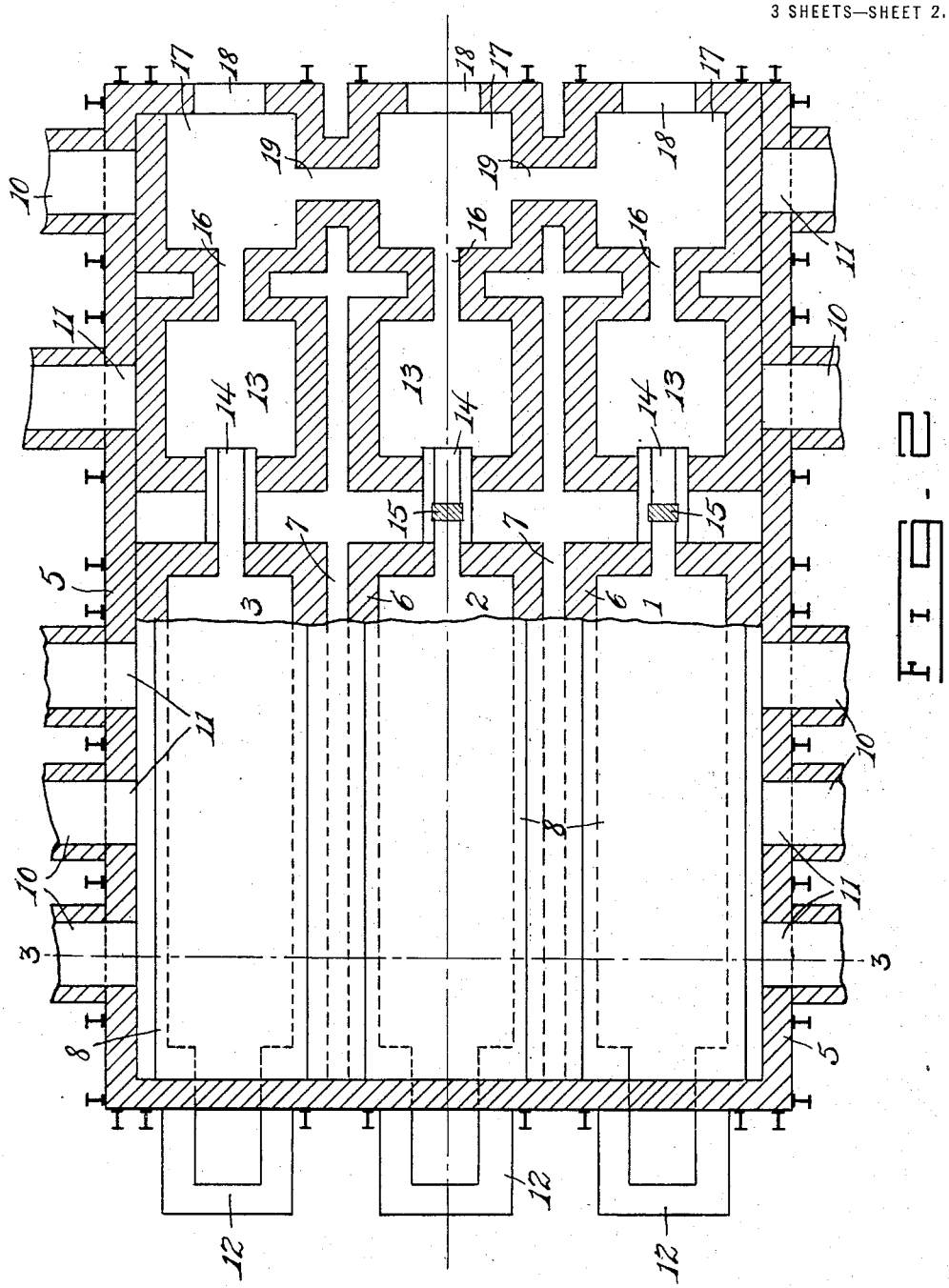

W. N. MATHEWS.
APARTMENT TANK GLASS FURNACE.
APPLICATION FILED DEC. 3, 1918.

1,324,917.

Patented Dec. 16, 1919.

INVENTOR
W. N. Mathews.
By H. E. Dunlap
ATTORNEY

UNITED STATES PATENT OFFICE.

WILLIAM N. MATHEWS, OF WELLSBURG, WEST VIRGINIA.

APARTMENT-TANK GLASS-FURNACE.

1,324,917. Specification of Letters Patent. Patented Dec. 16, 1919.

Application filed December 3, 1918. Serial No. 265,115.

*To all whom it may concern:*

Be it known that I, WILLIAM N. MATHEWS, a citizen of the United States of America, and resident of Wellsburg, county of Brooke, and State of West Virginia, have invented certain new and useful Improvements in Apartment-Tank Glass-Furnaces, of which the following is a specification.

This invention relates broadly to glass furnaces, and more particularly to a regenerative furnace for making lead glass, opal glass, lime glass and other kinds of glass, generally termed flint glass, which cannot be successfully made in open pots.

The primary object of the invention is to provide a glass furnace designed especially for the production of flint glass, or those kinds of glass which contain large proportions of lead oxid, which embodies a tank composed of separate apartments each of which is alternately employed for melting, plaining and flowing, thereby not only obviating the necessity for the usual second handling or ladling of glass from one pot or tank to another, but also providing for overcoming the necessity for reheating the glass.

A further object of the invention is to provide a furnace of the character mentioned embodying muffles which serve not only to promote the utmost cleanliness by preventing the deposit in the glass of foreign matter, but also to shield the glass from the lead fumes which would otherwise produce oxidation and discoloration.

Having in view these and other important objects which will hereinafter be made apparent, the invention resides in the features of construction, arrangement of elements and combinations of parts which will hereinafter be described, reference being had to the accompanying drawings, in which—

Figure 1 is a central longitudinal section of a furnace constructed in accordance with my invention;

Fig. 3 is a transverse section on line 3—3, Fig. 2,

Referring to said drawings, in which like designating characters distinguish like parts throughout the several views—

Figure 2:
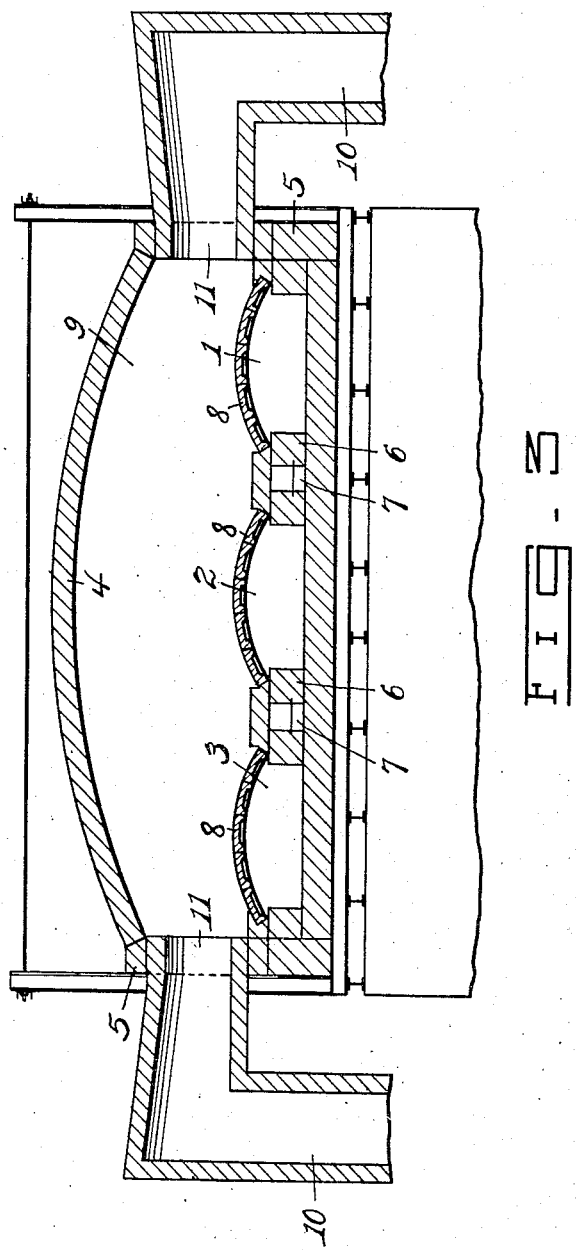
Fig. 2 is a section on line 2—2, Fig. 1.

1, 2 and 3 indicate, respectively, three similar non-communicating chambers or pots which are arranged side by side under a common arch or crown 4 which is supported by the outer side-walls 5. Said pots constitute an apartment tank in which they are separated by walls 6 having air spaces 7 therein, as shown.

Overlying the pots and supported by said walls 5 and 6 are arched muffles 8 which are composed of tile or other suitable refractory material and which serve to separate said pots from the overlying combustion chamber 9. Gas and air heated by suitably located regenerators (not shown) are conducted from the latter through flues 10 which discharge into the combustion chamber 9 through ports 11 located in the furnace walls 5.

Located at the outer end of each pot is the usual open extension, or dog house, 12 through which material is introduced into the pot, and located forward of each pot and on a lower level than the latter is a refining chamber 13 to which glass may be permitted to flow from such pot through a spout 14 which is normally kept closed by a suitable vertically adjustable plug 15.

Located forward of each refining chamber 13 and communicating with the latter through an open throat 16 is a working chamber 17, access to which for working out the glass contained thereby is had through a working opening 18 provided in the front wall thereof. Cross-throats 19 are provided between adjacent working chambers 17 so that glass may freely flow from one of said chambers to the others to maintain a uniform depth of glass therein, permitting simultaneous working from the three chambers.

In practice, the pots 1, 2 and 3 are operated so that each is in turn employed as a melting tank, as a plaining, or settling, tank, and as a flowing tank, and also in such manner that successive pots are always being employed differently. To illustrate, while pot 1 is beng employed as a melting pot, the glass previously melted in pot 2 is plaining, or settling, and previously plained glass in pot 3 is running therefrom to the adjacent refining chamber 13 through the then open spout 14. When pot 3 is emptied, new material is introduced therein and said pot is employed as a melting pot. At the same time, the glass in pot 1 is plaining and the glass in pot 2 is being permitted to flow. Thus, as is apparent, the various steps in the process of preparing the glass for working are continuously being performed.

As is obvious, the structural arrangement described not only renders unnecessary the common practice of ladling glass from a melting pot to a settling chamber, but it also provides for a gradual cooling of the glass in its passage from the pots to the working chamber. Furthermore, said arrangement overcomes the necessity for the usual reheating of the glass, which reheating is particularly objectionable due to the fact that, through a resultant chemical reaction which ensues, seeds or cords are produced which render glass products containing them of inferior quality, if not wholly valueless.

The arrangement of muffle arches over the various pots of the apartment tank described prevents the furnace gas from coming into contact with the glass, which would result in the reduction of some of the lead to a metallic state and thus produce discoloration of the glass. Moreover, said arrangement obviously shields the glass against the deposit therein of foreign particles and other impurities from the combustion chamber.

What is claimed is—

1. In a glass furnace, a tank composed of three adjacent non-communicating apartments adapted to be operated successively and each being alternately employed as a melting, plaining and flowing pot, a combustion chamber located over said tank, and muffle arches overlying said apartments and separating the latter from said combustion chamber.

2. In a glass furnace, a tank composed of three adjacent non-communicating apartments adapted to be operated successively and each being alternately employed as a melting, plaining and flowing pot, a combustion chamber located over said tank, muffle arches overlying said apartments and separating the latter from said combustion chamber, a refining chamber associated with each of said apartments and having communication therewith through a closable passage, and a working chamber in open communication with each of said refining chambers.

3. In a glass furnace, a tank composed of three adjacent non-communicating apartments adapted to be operated successively and each being alternately employed as a melting, plaining and flowing pot, a combustion chamber located over said tank, muffle arches overlying said apartments and separating the latter from said combustion chamber, a refining chamber associated with each of said apartments and having communication therewith through a closable passage, said refining chambers being located on a lower level than said apartments, and a working chamber located in front of and in open communication with each refining chamber, said working chambers having open communication.

4. In a glass furnace, a tank composed of three adjacent non-communicating apartments adapted to be operated successively and each being alternately employed as a melting, plaining and flowing pot, a combustion chamber located over said tank, muffle arches overlying said apartments and separating the latter from said combustion chamber, a refining chamber associated with each of said apartments and having communication therewith through a closable passage, said refining chambers being located on a lower level than said apartments so that the entire contents may flow from the latter through said passages, and a working chamber located in front of each refining chamber and communicating with the latter through an open throat, said working chambers being connected by means providing open throats.

5. In a glass furnace, a tank composed of three non-communicating apartments located side by side and separated by walls having air spaces therein, each of said apartments having at one end an opening through which material is introduced therein, said apartments being adapted for successive operation and each being alternately employed as a melting, plaining and flowing pot, a combustion chamber located over said tank, muffle arches overlying said apartments and separating the latter from said combustion chamber, refining chambers associated with said apartments, and working chambers associated with said refining chambers, said working chambers being connected to permit glass to flow from one to another thereof whereby a uniform glass level is maintained in said chambers.

6. In a glass furnace, a tank composed of three non-communicating apartments located side by side and separated by walls having air spaces therein, each of said apartments having at one end an opening through which material is introduced therein, said apartments being adapted for successive operation and each being alternately employed as a melting, plaining and flowing pot, a combustion chamber located over said tank, muffle arches overlying said apartments and separating the latter from said combustion chamber, a refining chamber located in front of each apartment and disposed at a lower level than the latter, a closable passage between each apartment and its refining chamber, and a working chamber located in front of each refining chamber and having communication with the latter through a throat, said working chambers being in communication.

In testimony whereof, I affix my signature in presence of two subscribing witnesses.

WILLIAM N. MATHEWS.

Witnesses:
H. E. DUNLAP,
R. W. MILLER.